(12) United States Patent
Park et al.

(10) Patent No.: US 10,146,377 B2
(45) Date of Patent: Dec. 4, 2018

(54) TOUCH SENSOR DEVICE

(71) Applicant: Samsung Display Co., Ltd., Yongin (KR)

(72) Inventors: Hee Woong Park, Hwaseong-si (KR); Hyung Chul Kim, Cheonan-si (KR); Jeong Heon Lee, Seongnam-si (KR); Byeong Kyu Jeon, Busan (KR)

(73) Assignee: Samsung Display Co., Ltd., Yongin-si (KR)

(*) Notice: Subject to any disclaimer, the term of this patent is extended or adjusted under 35 U.S.C. 154(b) by 284 days.

(21) Appl. No.: 14/729,898

(22) Filed: Jun. 3, 2015

(65) Prior Publication Data
US 2016/0170523 A1    Jun. 16, 2016

(30) Foreign Application Priority Data
Dec. 15, 2014  (KR) .......................... 10-2014-0180468

(51) Int. Cl.
*G06F 3/044*    (2006.01)
(52) U.S. Cl.
CPC .... *G06F 3/044* (2013.01); *G06F 2203/04102* (2013.01); *G06F 2203/04111* (2013.01)
(58) Field of Classification Search
None
See application file for complete search history.

(56) References Cited

U.S. PATENT DOCUMENTS

| | | | |
|---|---|---|---|
| 8,963,848 B2* | 2/2015 | Choi | G06F 3/044 345/173 |
| 9,372,509 B2 | 6/2016 | Chang et al. | |
| 9,696,834 B2* | 7/2017 | Park | G06F 3/041 |

(Continued)

FOREIGN PATENT DOCUMENTS

| | | | | |
|---|---|---|---|---|
| CN | 102681734 A | * | 9/2012 | G06F 3/044 |
| KR | 20110123987 A | * | 11/2011 | G06F 3/044 |

(Continued)

OTHER PUBLICATIONS

Non-Final Office Action dated Sep. 18, 2018, issued in U.S. Appl. No. 16/033,212.

*Primary Examiner* — Srilakshmi K Kumar
*Assistant Examiner* — Karin Kiyabu
(74) *Attorney, Agent, or Firm* — H.C. Park & Associates, PLC

(57) ABSTRACT

The present disclosure relates to a touch sensor device. More particularly, the present disclosure relates to a flexible touch sensor device. A touch sensor device according to an exemplary embodiment of the present disclosure includes a first touch sensing region and a second touch sensing region, wherein each of the first touch sensing region and the second touch sensing region includes a plurality of first touch electrodes and a plurality of second touch electrodes, a first connection portion connecting two adjacent first touch electrodes among the plurality of first touch electrodes, and a second connection portion connecting two adjacent second touch electrodes among the plurality of second touch electrodes, wherein an extending direction of the first connection portion positioned at the first touch sensing region is different from an extending direction of the first connection portion positioned at the second touch sensing region.

14 Claims, 10 Drawing Sheets

(56) References Cited

U.S. PATENT DOCUMENTS

| | | | | |
|---|---|---|---|---|
| 9,933,886 B2* | 4/2018 | Kim | | G06F 3/0416 |
| 2009/0322689 A1* | 12/2009 | Kwong | | G06F 3/04883 |
| | | | | 345/173 |
| 2010/0066683 A1* | 3/2010 | Chang | | B32B 37/025 |
| | | | | 345/173 |
| 2011/0057887 A1* | 3/2011 | Lin | | G06F 3/044 |
| | | | | 345/173 |
| 2013/0088459 A1* | 4/2013 | Yeh | | G06F 3/044 |
| | | | | 345/174 |
| 2013/0215035 A1* | 8/2013 | Guard | | G06F 3/0221 |
| | | | | 345/168 |
| 2013/0234739 A1 | 9/2013 | Deng | | |
| 2013/0285938 A1* | 10/2013 | Kang | | G06F 3/041 |
| | | | | 345/173 |
| 2013/0300678 A1 | 11/2013 | Kang et al. | | |
| 2013/0328830 A1* | 12/2013 | Han | | G06F 3/0418 |
| | | | | 345/174 |
| 2014/0061597 A1* | 3/2014 | Choi | | H01L 51/5284 |
| | | | | 257/40 |
| 2014/0104185 A1 | 4/2014 | Hu et al. | | |
| 2014/0132553 A1* | 5/2014 | Park | | G06F 3/044 |
| | | | | 345/174 |
| 2014/0168109 A1* | 6/2014 | Kang | | G06F 3/044 |
| | | | | 345/173 |
| 2014/0232950 A1* | 8/2014 | Park | | G06F 3/044 |
| | | | | 349/12 |
| 2014/0267953 A1* | 9/2014 | Kim | | G06F 3/044 |
| | | | | 349/12 |
| 2015/0242022 A1* | 8/2015 | Hung | | G06F 1/1615 |
| | | | | 345/174 |
| 2015/0277627 A1* | 10/2015 | Pang | | G06F 3/044 |
| | | | | 345/174 |
| 2016/0054832 A1* | 2/2016 | Kim | | G06F 3/044 |
| | | | | 345/174 |
| 2016/0202814 A1* | 7/2016 | Lee | | G06F 3/044 |
| | | | | 345/173 |
| 2016/0202831 A1* | 7/2016 | Kim | | G06F 3/044 |
| | | | | 345/173 |
| 2017/0147114 A1* | 5/2017 | Dong | | G06F 3/0412 |
| 2017/0277292 A1* | 9/2017 | Park | | G06F 3/044 |
| 2017/0285837 A1* | 10/2017 | Zeng | | G06F 3/0416 |

FOREIGN PATENT DOCUMENTS

| | | |
|---|---|---|
| KR | 10-2013-0126007 | 11/2013 |
| KR | 10-2014-0062269 | 5/2014 |

* cited by examiner

TOUCH SENSOR DEVICE

CROSS-REFERENCE TO RELATED APPLICATION

This application claims priority from and the benefit of Korean Patent Application No. 10-2014-0180468, filed on Dec. 15, 2014, which is hereby incorporated by reference for all purposes as if fully set forth herein.

BACKGROUND

Field

Exemplary embodiments relate to a touch sensor device. More particularly, the present disclosure relates to a flexible touch sensor device.

Discussion of the Background

An electronic device such as a liquid crystal display (LCD), an organic light emitting diode display (OLED display), and an electrophoretic display may include a touch sensing function such that it is capable of user interaction. A touch sensing function determines whether a user's finger, or some other touch instrument, touches a screen, and the touch position information thereof, by sensing a change of pressure, light, etc., that occurs on a screen in the display device when the user's finger or a touch pen contacts the screen to write a character or to draw a picture.

The touch sensing function of many types of electronic devices may be realized through a touch sensor. The touch sensor may be classified into various types such as a resistive type, a capacitive type, an electro-magnetic (EM) type, and an optical type.

For example, the capacitive touch sensor includes a sensing capacitor formed by a sensing electrode which may transfer a sensing signal, and senses a change in capacitance of the sensing capacitor generated when a conductor such as a finger approaches the touch sensor to determine existence of a touch, a touch position, and the like. The capacitive touch sensor may include a plurality of touch electrodes disposed in a touch sensing region sensing the touch and touch wires connected to the touch electrodes. The touch wires may transmit a sensing input signal to the touch electrode and transmit a sensing output signal of the touch electrode generated depending on the touch to a touch driver.

The touch sensor may be installed in the display device (an in-cell type), formed on an outer surface of the display device (an on-cell type), or attached via a separate touch sensor panel to the display device (an add-on cell type). Particularly, in a case of a flexible display device, an add-on cell type may be used by adhering a film in which the touch sensor is formed on to the display panel or by forming and adhering a separate touch sensor device having a plate shape on the display panel.

When producing various electronic devices having such display devices, the touch sensor device uses a glass substrate that is heavy and easily damaged. Accordingly, this limits its portability and implementation of large-scale screen displays. However, recently, a flexible electronic device which is light, impact-resistant, and uses a plastic substrate having high flexibility, such as polyamide (PI), has been actively developed. In this case, the flexible touch sensor device may include a portion that is bendable, foldable, rollable, stretchable in at least one direction, or is elastic and can be deformed.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention prevent failure of a touch sensor by reducing a stress applied to a conductive layer when the flexible touch sensor device is bent or folded.

Additional aspects will be set forth in the detailed description which follows, and, in part, will be apparent from the disclosure, or may be learned by practice of the inventive concept.

According to exemplary embodiments, a touch sensor includes a first touch sensing region and a second touch sensing region, wherein each of the first touch sensing region and the second touch sensing region includes a plurality of first touch electrodes and a plurality of second touch electrodes, a first connection portion connecting two adjacent first touch electrodes among the plurality of first touch electrodes, and a second connection portion connecting two adjacent second touch electrodes among the plurality of second touch electrodes, wherein an extending direction of the first connection portion positioned at the first touch sensing region is different from an extending direction of the second connection portion positioned at the second touch sensing region.

A touch sensor device according to an exemplary embodiment of the present invention includes a first touch sensing region and a second touch sensing region, wherein the first touch sensing region includes a plurality of first touch electrodes and a plurality of second touch electrodes, a first connection portion connecting two adjacent first touch electrodes among the plurality of first touch electrodes, and a second connection portion connecting two adjacent second touch electrodes among the plurality of second touch electrodes, and the second touch sensing region includes a plurality of third touch electrodes, and a plurality of touch wires respectively connected to the plurality of third touch electrodes, and the plurality of third touch electrodes are separated from each other in the second touch sensing region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
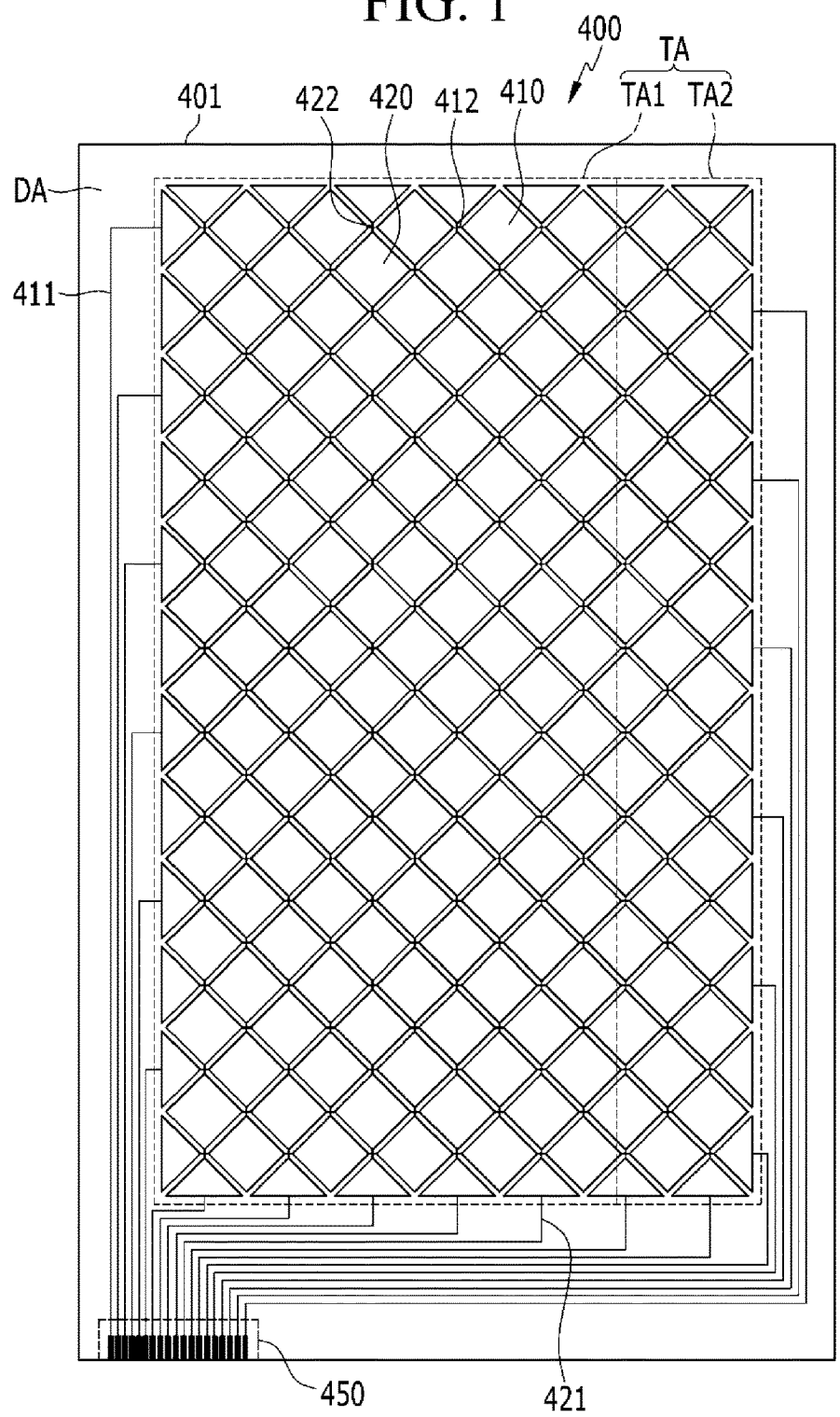
FIG. 1 is a top plan view of a touch sensor device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A touch sensor device according to an exemplary embodiment of the present invention will be described with reference to FIG. 1 through FIG. 5.

Figure 2:
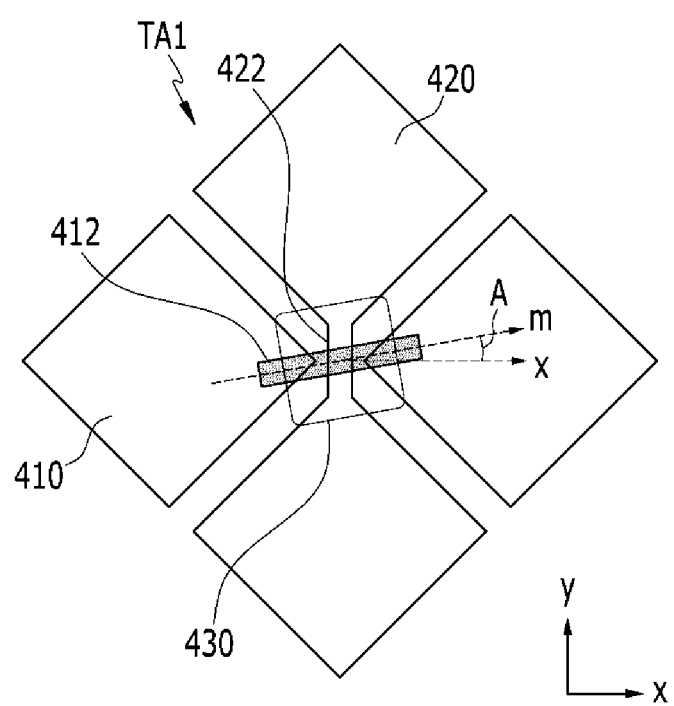
FIG. 2 is an enlarged view of a partial region of a touch sensor device according to an exemplary embodiment of the present invention.
Figure 3:
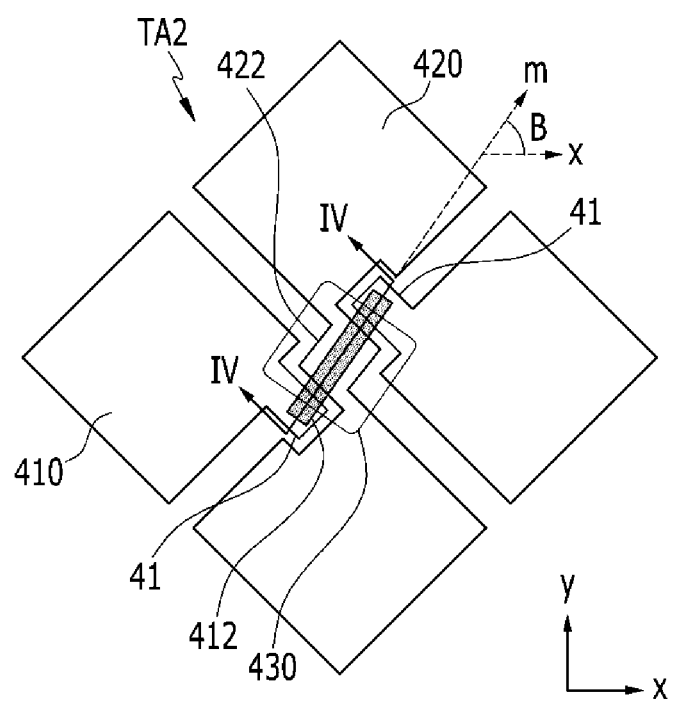
FIG. 3 is an enlarged view of a partial region of a touch sensor device according to an exemplary embodiment of the present invention.
Figure 4:
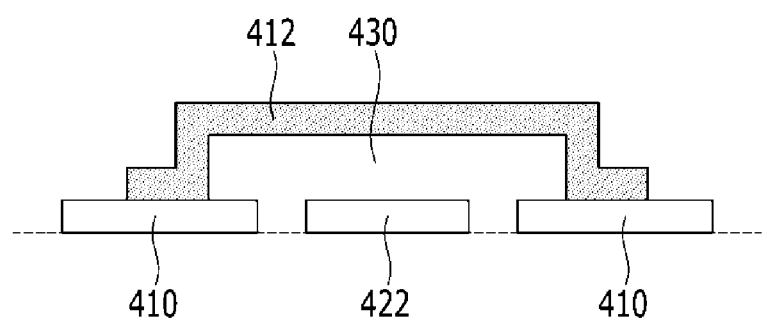
FIG. 4 is a cross-sectional view of the touch sensor device shown in FIG. 3 taken along a line IV-IV.
Figure 5:
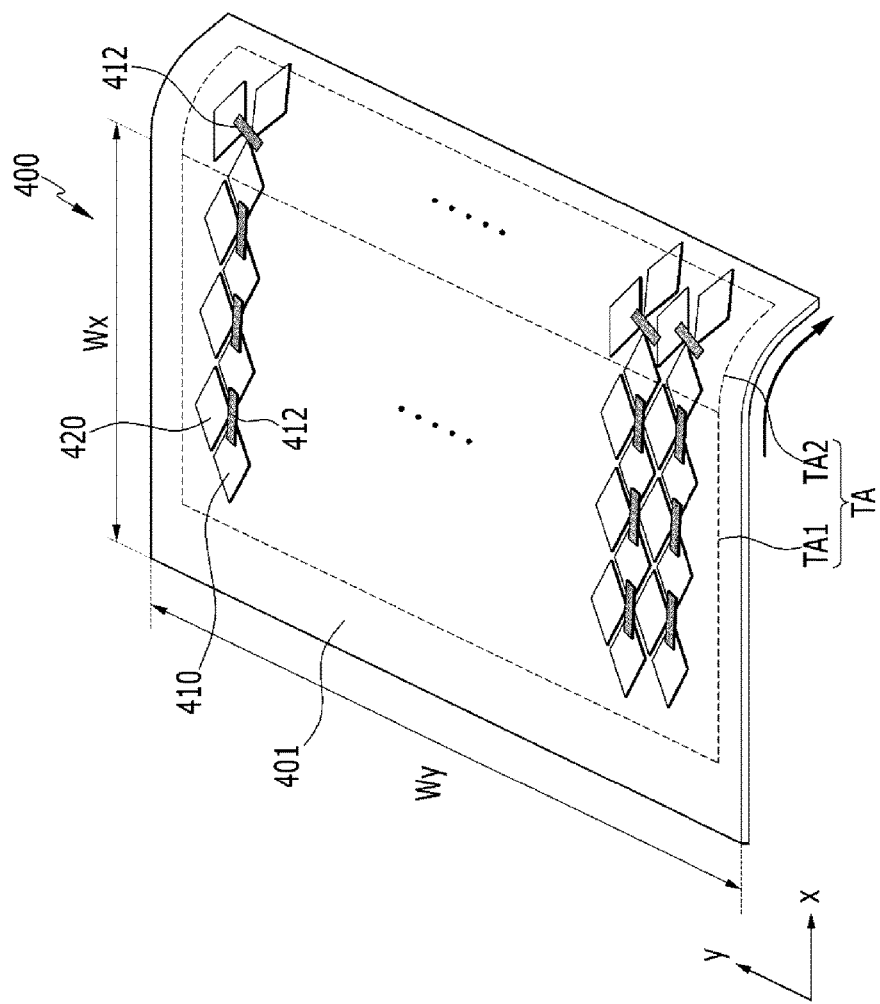
FIG. 5 is a view showing a shape of a portion of a touch sensor device according to an exemplary embodiment of the present invention that is deformed.

FIG. 1 is a top plan view of a touch sensor device according to an exemplary embodiment of the present invention, FIG. 2 is an enlarged view of a partial region of a touch sensor device according to an exemplary embodiment of the present invention, FIG. 3 is an enlarged view of a partial region of a touch sensor device according to an exemplary embodiment of the present invention, FIG. 4 is a cross-sectional view of the touch sensor device shown in FIG. 3 taken along a line IV-IV, and FIG. 5 is a view showing a shape of a portion of a touch sensor device according to an exemplary embodiment of the present invention that is deformed.

A touch sensor device 400 according to an exemplary embodiment of the present invention may sense a contact by an external object. Here, the sensed contact includes a case where the external object approaches the touch sensor device 400 or hovers in the approached state, as well as a case where the external object such as a finger of the user directly contacts the upper surface of the touch sensor device 400.

Referring to FIG. 1, in a plan view, the touch sensor device 400 includes a touch sensing region TA as a region where the contact by the external object may be sensed and a non-sensing region DA outside the touch sensing region TA. The non-sensing region DA may also be referred to as a dead space.

In a view of the cross-sectional structure, the touch sensor device 400 includes a touch substrate 401 and at least one touch electrode layer formed thereon.

The touch substrate 401 may include a flexible film having flexibility. The touch substrate 401 may include a plastic such as polyethylene terephthalate (PET), polyethylene naphthalate, polycarbonate, polyarylate, polyetherimide, polyether sulfone, polyimide, and the like.

The touch electrode layer includes a plurality of touch electrodes 410 and 420 and a plurality of touch wires 411 and 421 connected thereto. The plurality of touch electrodes 410 and 420 may be mainly positioned in the touch sensing region TA, and the touch wires 411 and 421 may be positioned in the touch sensing region TA or in the non-sensing region DA.

The touch electrodes 410 and 420 may have more than or equal to a predetermined transmittance rate to transmit light. For example, the touch electrode 410 and 420 may include a transparent conductive oxide such as ITO (indium tin oxide) and IZO (indium zinc oxide), however it is not limited thereto and they may include at least one of a transparent conductive material such as a metal nanowire, a conductive polymer such as PEDOT, a metal mesh, carbon nanotubes (CNT), and a thin metal layer.

The touch wires 411 and 421 may include the transparent conductive material included in the touch electrodes 410 and 420 and/or a low resistance material such as molybdenum (Mo), silver (Ag), titanium (Ti), copper (Cu), aluminum (Al), and molybdenum/aluminum/molybdenum (Mo/Al/Mo).

The touch wires 411 and 421 may include a portion that is positioned in the same layer as the touch electrodes 410 and 420, or not.

The touch electrodes 410 and 420 form a touch sensor that may sense the contact by various methods. The touch sensor may be a touch sensor using various methods such as a resistive type, a capacitive type, an electro-magnetic (EM) type, and an optical type. In the present exemplary embodiment, a capacitive type of touch sensor will be described. However exemplary embodiments of the present invention are not limited thereto.

The capacitive type of touch sensor may receive a sensing input signal from a touch driver (not shown) by one of the touch electrodes 410 and 420, and may output a sensing output signal that is changed depending on the contact of the external object.

When the touch electrodes 410 and 420 form a self-sensing capacitor with a foreign object, the touch electrode receives the sensing input signal and is charged with a predetermined amount of charge, and when there is a contact by a foreign object such as a finger, the amount of charge stored in the self-sensing capacitor is changed and a sensing output signal that is different from the input sensing input signal is output. Contact information such as a contact state or a contact position is known by the change of the sensing output signal.

When neighboring touch electrodes 410 and 420 form a mutual-sensing capacitor, one touch electrode receives the sensing input signal from the driver and the self-sensing capacitor is charged with a predetermined amount of charge. When there is a contact by a foreign object such as a finger, the stored amount of charge of the self-sensing capacitor is changed and the changed amount of charge is output as a sensing output signal through the touch electrodes 410 and 420. The contact information such as a contact state or a contact position is known by the sensing output signal.

The touch sensor forming the mutual-sensing capacitor will be described in the present exemplary embodiment as an example.

Referring to FIG. 1, the touch electrodes 410 and 420 of the touch sensor according to an exemplary embodiment of the present invention may include a plurality of first touch electrodes 410 and a plurality of second touch electrodes 420. The first touch electrode 410 and the second touch electrode 420 are separated from each other.

The first touch electrode 410 and the second touch electrode 420 may be positioned in the same layer.

A shape of each of the first touch electrode 410 and the second touch electrode 420 may be a quadrangle, but is not limited thereto, and may have various forms such as a form having a protrusion in order to improve sensitivity of the touch detecting sensor.

The first touch electrode 410 and the second touch electrode 420 may be disposed to be alternately distributed such that they do not overlap each other in the touch active area TA. The plurality of first touch electrodes 410 are disposed in plural along a column direction and a row direction, and the plurality of second touch electrodes 420 are disposed in plural along a column direction and a row direction.

The plurality of first touch electrodes 410 arranged in the same row or column may be connected with or separated from each other inside or outside the touch sensing area TA. Similarly, at least some of the plurality of second touch electrodes 420 arranged in the same column or row may be connected with or separated from each other inside or outside the touch sensing area TA. For example, in a case where the plurality of first touch electrodes 410 arranged in the same row are connected with each other inside the touch sensing area TA as illustrated in FIG. 1, the plurality of second touch electrodes 420 arranged in the same column may be connected with each other inside the touch sensing area TA.

According to an exemplary embodiment of the present invention, the plurality of first touch electrodes 410 positioned in each row may be connected with each other through a first connection part 412, and the plurality of second touch electrodes 420 positioned in each column may be connected with each other through a second connection part 422.

Referring to FIG. 2 to FIG. 4, the second connection part 422 connecting the adjacent second touch electrodes 420 may be positioned on the same layer as that of the second touch electrodes 420 and formed of the same material as that of the second touch electrodes 420. That is, the second touch electrode 420 and the second connection part 422 may be integrated with each other, and may be simultaneously patterned.

The first connection part 412 connecting the adjacent first touch electrodes 410 may be positioned on a different layer from that of the first touch electrode 410. That is, the first touch electrode 410 and the first connection part 412 may be separated from each other, and may be separately patterned. The first touch electrode 410 and the first connection part 412 may be connected with each other through a direct contact.

An insulating layer 430 is positioned between the first connection part 412 and the second connection part 422 to insulate the first connection part 412 and the second connection part 422 from each other. The insulating layers 430 may be a plurality of separated island-shaped insulators each of which is disposed at every crossing portion of the first connection part 412. The insulating layer 430 may expose at least a part of the second touch electrode 420 so that the second connection part 422 is connectable with the second touch electrode 420.

According to another exemplary embodiment of the present invention, the insulating layer 430 is formed on the entire area on the touch substrate 404, and the insulating layer 430 positioned on the portion of the first touch electrode 410 may be removed for the connection of the first touch electrodes 410 in the adjacent column direction via the first connection part 412.

Contrary to FIG. 2 to FIG. 4, a first connection part 412 connecting the adjacent first touch electrodes 410 may be positioned on the same layer as that of a first touch electrode 410 and integrated with the first touch electrode 410, and a second connection part 422 connecting the adjacent second touch electrodes 420 may be positioned on a different layer from that of the second touch electrode 410.

Referring to FIG. 5, when a width Wx of the touch sensor device 400 in a x-axis direction is shorter than a width Wy in a y-axis direction, the first connection portion 412 connecting the first touch electrode 410 arranged in the x-axis direction may be positioned on the different layer from that of the first and second touch electrodes 410 and 420.

Referring to FIG. 1, the first touch electrodes 410 connected with each other in each row may be connected with a touch driver (not shown) through a first touch wire 411, and the second touch electrodes 420 connected with each other in each column may be connected with the touch driver through a second touch wire 421. The first touch wires 411 and the second touch wires 421 may be positioned in the non-sensing region DA. However, they may also be positioned in the touch sensing region TA.

End portions of the first touch wire 411 and the second touch wire 421 form a pad portion 450 in the non-sensing area DA of the touch sensor unit 400.

The first touch wire 411 inputs the sensing input signal to the first touch electrode 410 or outputs the sensing output signal to the touch driver through the pad portion 450. The second touch wire 421 inputs the sensing input signal to the second touch electrode 420 and outputs the sensing output signal through the pad portion 450.

The touch driver controls the operation of the touch sensor. The touch driver may transmit the sensing input signal to the touch sensor and may receive a sensing output signal to be processed. The touch driver processes the sensing output signal to generate the touch information such as the touch and the touch position.

The first touch electrode 410 and the second touch electrode 420 adjacent to each other may form the mutual sensing capacitor serving as the touch sensor. The mutual sensing capacitor may receive the sensing input signal through one of the first touch electrode 410 and the second touch electrode 420, and may output the change of the charge amount by the contact of the external object as the sensing output signal to the rest of the touch electrodes.

Differently from FIG. 1, a plurality of first touch electrodes 410 and a plurality of second touch electrodes 420 may be separated from each other and may be respectively connected to the touch driver through the touch wires (not shown). In this case, the touch electrodes 410 and 420 may form the self-sensing capacitor as the touch sensor. The self-sensing capacitor receives the sensing input signal to be charged by a predetermined charge amount, and may output a sensing output signal that is different from the sensing input signal which is input due to a change in the charged charge amount generated when the external object such as a finger makes contact.

Referring to FIG. 1 through FIG. 5, the touch sensing region TA of the touch sensor device 400 according to an exemplary embodiment of the present invention includes a first touch sensing region TA1 and a second touch sensing region TA2.

The first touch sensing region TA1 may maintain a substantially fixed state, and the second touch sensing region TA2 may be deformed such as by the bending or the folding, or may be in deformed state that is not a flat state.

In the manufacturing process of the touch sensor device 400 or the process of adhering the touch sensor device 400 to another electronic device such as a display device or the process using it, the first touch sensing region TA1 may maintain the substantially fixed state, and the second touch sensing region TA2 may be deformed such as by the bending or the folding, or may be in deformed state that is not the flat state. For example, the first touch sensing region TA1, as shown in FIG. 5, may maintain the flat state and the second touch sensing region TA2 may have the flexibility to be bended, folded, or curved in at least one direction.

According to another exemplary embodiment of the present invention, the first touch sensing region TA1 and the second touch sensing region TA2 may be deformed such as by the bending or the folding, or may be in deformed state that is not a flat state. In this case, a curvature radius of the second touch sensing region TA2 may be smaller than the curvature radius of the first touch sensing region TA1. When the first touch sensing region TA1 of the touch sensor device 400 has the fixed state without the flexibility, the curvature radius of the first touch sensing region TA1 is very large, thereby being substantially flat.

Referring to FIG. 5, the second touch sensing region TA2 of the touch sensor device 400 according to an exemplary embodiment of the present invention is bent, folded, or curved along the x-axis direction, but it is not limited thereto.

As described above, the mechanical characteristics of the first touch sensing region TA1 and the second touch sensing region TA2 such as the flexibility are different, and the structure of the touch electrode layer of the first touch sensing region TA1 may be different from the structure of the touch electrode layer of the second touch sensing region TA2. Accordingly, the failure may be prevented from being generated in the first touch sensing region TA1 and the second touch sensing region TA2 and the touch may be normally sensed.

Referring to FIG. 2 and FIG. 3, an angle A of the extending direction m of the first connection portion 412 positioned at the first touch sensing region TA1 of the touch sensor device 400 according to an exemplary embodiment of the present invention for the x-axis direction may be different from the angle B of the extending direction m of the first connection portion 412 positioned at the second touch sensing region TA2 for the x-axis direction.

In detail, when the second touch sensing region TA2 may be deformed in the x-axis direction, the angle B of the extending direction m of the first connection portion 412 positioned at the second touch sensing region TA2 for the x-axis direction may be larger than the angle A of the extending direction m of the first connection portion 412 positioned at the first touch sensing region TA1. For example, the angle B of the extending direction m of the first connection portion 412 positioned at the second touch sensing region TA2 for the x-axis direction may be more than or equal to about 45 degrees and less than about 90 degrees, but it is not limited thereto. The angle A of the extending direction m of the first connection portion 412 positioned at the first touch sensing region TA1 may be equal to or more than 0 degree and equal to or less than about 45 degrees, however it is not limited thereto.

Referring to FIG. 3, in the second touch sensing region TA2, to connect the first connection portion 412 having the large angle of equal to or more than about 45 degrees for the x-axis direction and the first touch electrode 410, the first touch electrode 410 may include a protrusion 41. The protrusion 41 may be protruded toward a region of the adjacent second touch electrodes 420 and may be obliquely protruded for the x-axis direction. Accordingly, the second touch electrode 420 adjacent to the protrusion 41 may include a concave portion that is engaged with the shape of the protrusion 41. The first connection portion 412 contacts the protrusion 41 of two first touch electrodes 410 facing each other via the second connection portion 422 to be electrically connected.

In the touch sensor device 400 according to an exemplary embodiment of the present invention, the area of the first touch sensing region TA1 may be larger than the area of the second touch sensing region TA2. When the width Wx of the first touch sensing region TA1 in the x-axis direction is shorter than the width Wy of the y-axis direction, the width of the x-axis direction of the second touch sensing region TA2 having the smaller area than the first touch sensing region TA1 may be smaller than the width of the y-axis direction.

As descried above, when the width Wx of the first touch sensing region TA1 of the x-axis direction is shorter than the width Wy of the y-axis direction, the first connection portion 412 connecting the first touch electrodes 410 arranged in the x-axis direction may be positioned with the different layer from the first and second touch electrodes 410 and 420. Thus, the extending direction of the first connection portion 412 in the first touch sensing region TA1 is closer to the x-axis direction rather than the y-axis direction, and the width Wx of the first touch sensing region TA1 in the x-axis direction is smaller than the width Wy of the y-axis direction such that the long side of the first connection portion 412 may be prevented from being visible to be elongated and connected. That is, it may be minimized that the plurality of first connection portions 412 are arranged in substantially the same direction as the extending direction of the long side of the first connection portion 412. Thus, when the touch sensor device 400 is adhered to and used with the electronic device such as the display device, in the first touch sensing region TA1 having the relatively wide area, the moiré that is generated between lattice patterns appearing in the first connection portion 412 and the electronic device can be reduced.

Figure 6:
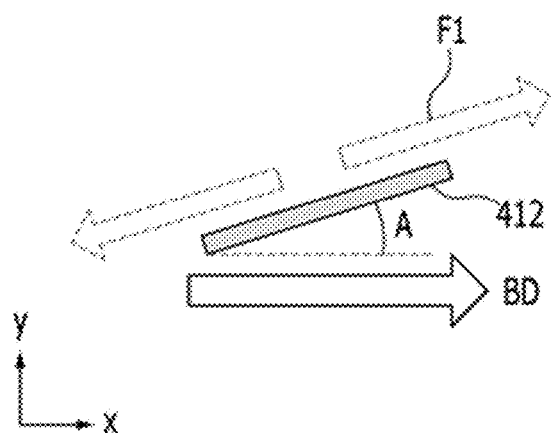
FIG. 6 is a view showing a stress applied to a connection portion positioned at a deformed region when a portion of a touch sensor device according to a conventional art is deformed.
Figure 7:
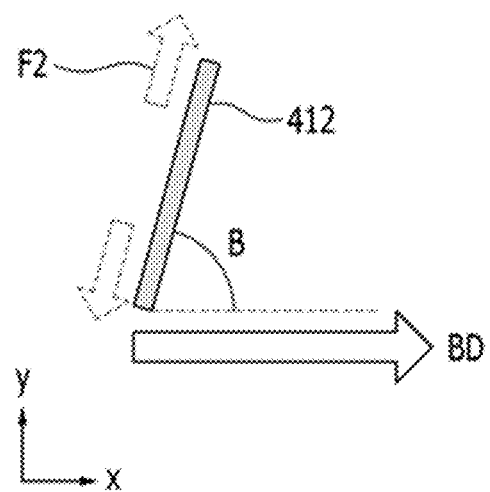
FIG. 7 is a view showing a stress applied to a connection portion positioned at a deformed region when a portion of a touch sensor device according to an exemplary embodiment of the present invention is deformed.

FIG. 6 is a view showing a stress applied to a connection portion positioned at a deformed region when a portion of a touch sensor device according to a conventional art is deformed, and FIG. 7 is a view showing a stress applied to a connection portion positioned at a deformed region when a portion of a touch sensor device according to an exemplary embodiment of the present invention is deformed.

Referring to FIG. 6, like the conventional art, if the first connection portion 412 positioned at the second touch sensing region TA2 extends to be closer to the x-axis direction than the y-axis direction, when the deformation BD such as the bending, the folding, or the curving is generated in the x-axis direction, the stress F1 applied to the first connection portion 412 is large such that a failure such as a crack may be easily generated in the first connection portion 412. The stress F1 may be a tensile stress or a compressive stress. Particularly, since the first connection portion 412 is positioned at an upper layer among the touch electrode layer, it may be weak to the generation of the crack by the stress F1 and the crack generation possibility is further increased when being thicker to have low resistance.

However, referring to FIG. 7, like an exemplary embodiment of the present invention, if the first connection portion 412 positioned at the second touch sensing region TA2 extends to be closer to the y-axis direction than the x-axis direction, although the deformation BD such as the bending, the folding, and the curving is generated in the x-axis direction, the stress F2 applied to the first connection portion 412 is relatively small such that the failure such as the crack is not easily generated in the first connection portion 412. Although the first connection portion 412 is positioned at the upper layer among the touch electrode layer, the stress F2 applied to the first connection portion 412 is small such that the failure possibility in the first connection portion 412 may be reduced. Accordingly, it is advantageous to bend or fold the second touch sensing region TA2 in a wanted shape.

Figure 8:
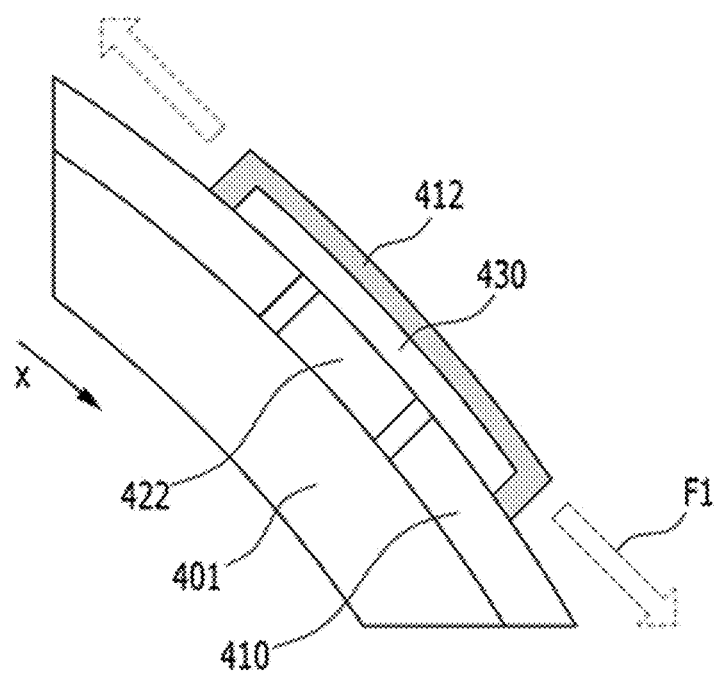
FIG. 8 is a cross-sectional view of a partial region of a touch sensor device according to a conventional art showing a stress applied to a connection portion positioned at a deformed region when the touch sensor device is deformed.
Figure 9:
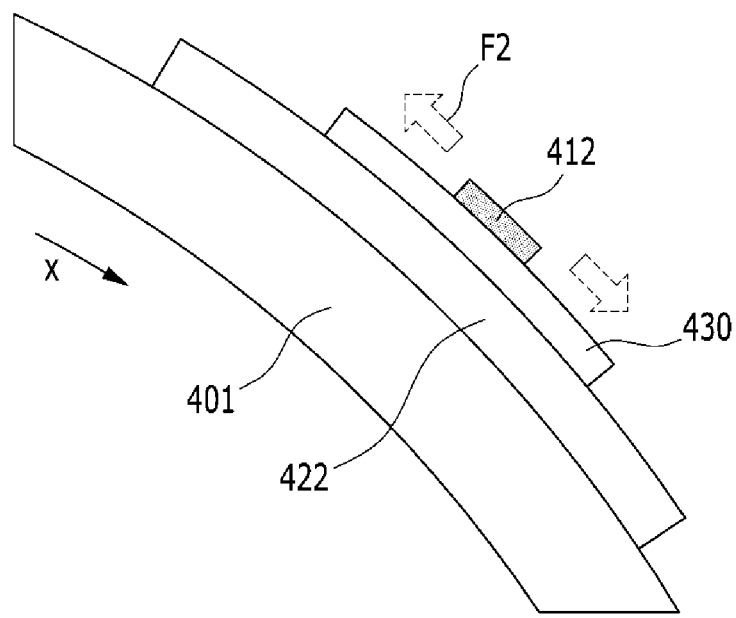
FIG. 9 is a cross-sectional view of a partial region of a touch sensor device according to an exemplary embodiment of the present invention showing a stress applied to a connection portion positioned at a deformed region when the touch sensor device is deformed.

FIG. 8 is a cross-sectional view of a partial region of a touch sensor device according to a conventional art showing a stress applied to a connection portion positioned at a deformed region when the touch sensor device is deformed, and FIG. 9 is a cross-sectional view of a partial region of a touch sensor device according to an exemplary embodiment of the present invention showing a stress applied to a connection portion positioned at a deformed region when the touch sensor device is deformed.

Referring to FIG. 8, for the touch sensor device 400 according to an exemplary embodiment of the present invention in a view of the cross-sectional structure, if the first connection portion 412 positioned at the second touch sensing region TA2 is elongated in the x-axis direction like the conventional art, the stress F1 applied to the first connection portion 412 positioned outside when the touch sensor device 400 is bended or folded in the x-axis direction is very large.

However, referring to FIG. 9, like an exemplary embodiment of the present invention, the first connection portion 412 positioned at the second touch sensing region TA2 extends to be closer to the y-axis direction than the x-axis direction, the length formed in the x-axis direction is decreased. Accordingly, although the touch sensor device 400 is curved, bended, or folded in the x-axis direction, the stress F2 applied to the first connection portion 412 is relatively small.

Accordingly, the second touch sensing region TA2 may have the structure that is advantageous for the deformation such as the curving.

Next, the touch sensor device according to an exemplary embodiment of the present invention will be described with reference to FIG. 10 and FIG. 11.

Figure 10:
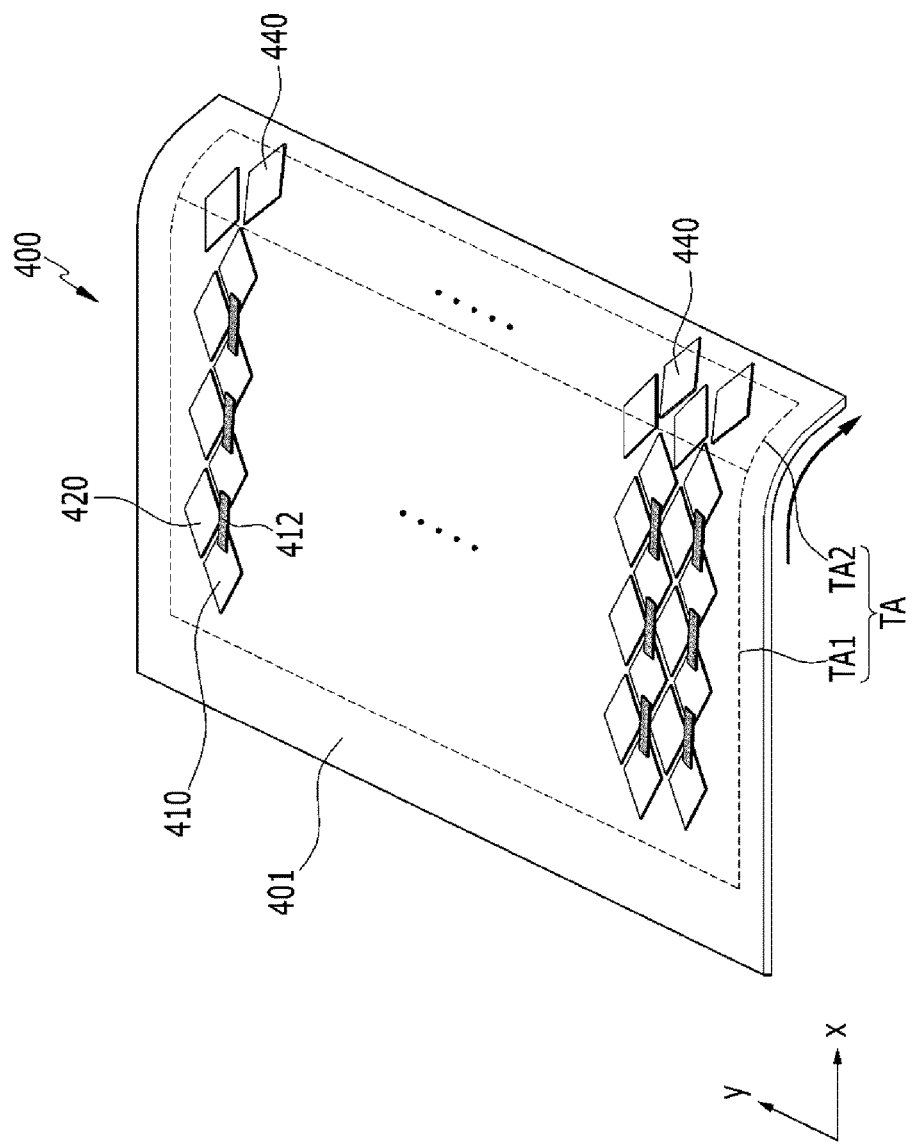
FIG. 10 is a view showing a shape of a portion of a touch sensor device according to an exemplary embodiment of the present invention that is deformed.
Figure 11:
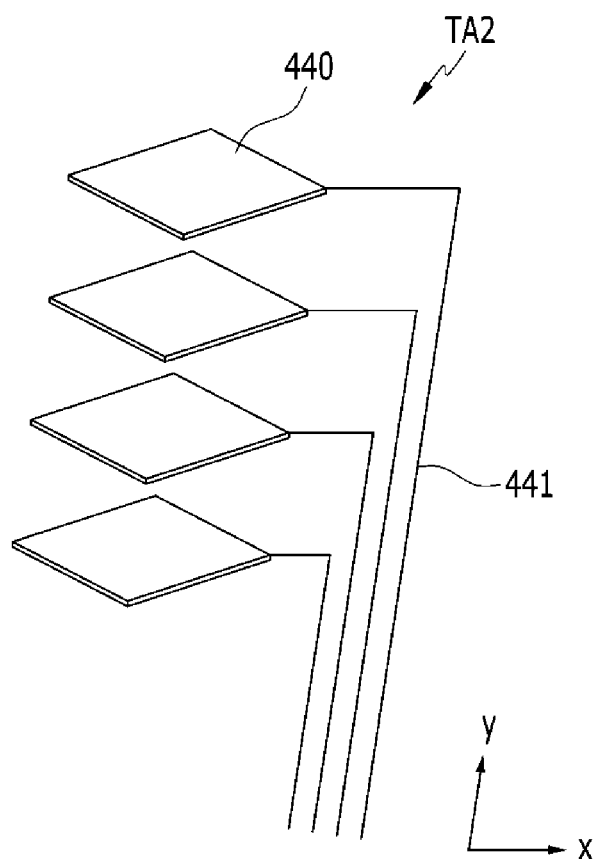
FIG. 11 is a view showing a touch electrode positioned at a partial region of a touch sensor device according to an exemplary embodiment of the present invention.

FIG. 10 is a view showing a shape in which a portion of a touch sensor device according to an exemplary embodiment of the present invention is deformed, and FIG. 11 is a view showing a touch electrode positioned at a partial region of a touch sensor device according to an exemplary embodiment of the present invention.

Referring to FIG. 10 and FIG. 11, the touch sensor device 400 according to an exemplary embodiment of the present invention is the same as most of the touch sensor device according to the previously described exemplary embodiment except for the structure of the second touch sensing region TA2.

According to an exemplary embodiment of the present invention, a plurality of touch electrodes 440 positioned at the same layer may be positioned in the second touch sensing region TA2. The plurality of touch electrodes 440 may be arranged in the y-axis direction and may be separated from each other. The touch electrodes 440 are respectively connected to touch wires 441 to be connected to the touch driver. In this case, the touch electrodes 440 may form a self-sensing capacitor as the touch sensor. The touch electrode 440 may be charged with a predetermined charge amount by receiving the sensing input signal through the touch wires 441, and if the contact of the external object such as the finger is generated, the change of the charged charge amount is generated and the sensing output signal that is different from the input sensing input signal may be output through the touch wires 441 to the touch driver.

According to the present exemplary embodiment, in the manufacturing process of the touch sensor device 400, in the assembling process with other electronic devices, or the usage process, the connection position that is positioned at the different layer from the touch electrode 440 does not exist in the second touch sensing region TA2 having the deformation such as the bending, the folding, and the curving. Accordingly, there is no conductive layer in which the crack is easily generated in the deformation such that the failure of the touch sensor due to the deformation may be minimized.

In the present exemplary embodiment, the driving signal input to the touch sensor made of the mutual sensing capacitor including the first and second touch electrodes 410 and 420 of the first touch sensing region TA1 may be different from the driving signal input to the touch sensor made of the self-sensing capacitor including the touch electrode 440 of the second touch sensing region TA2.

According to one or more exemplary embodiments of the present disclosure, when the flexible touch sensor device is deformable such as through the bending and the folding, the stress applied to the conductive layer is reduced such that the failure of the touch sensor due to the deformation may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor device, comprising:
a first touch sensing region and a second touch sensing region,
wherein each of the first touch sensing region and the second touch sensing region includes:
first touch electrodes and second touch electrodes;
first connection portions each connecting two adjacent first touch electrodes among the first touch electrodes; and
second connection portions each connecting two adjacent second touch electrodes among the second touch electrodes,
wherein:
the second touch sensing region is curved along a curvature axis,
at least two adjacent ones of the first connection portions positioned at the first touch sensing region extend in a first extending direction, and
at least two adjacent ones of the first connection portions positioned at the second touch sensing region extend in a second extending direction different from the first extending direction.

2. The touch sensor device of claim 1, wherein:
the first touch electrodes at the first touch sensing region and the second touch sensing region are arranged in a first direction, and
a first angle between the first extending direction and the first direction is smaller than a second angle between the second extending direction and the first direction.

3. The touch sensor device of claim 2, wherein
the second angle is equal to or more than about 45 degrees and less than about 90 degrees.

4. The touch sensor device of claim 3, wherein
the first connection portion is positioned at an upper layer of the first touch electrode.

5. The touch sensor device of claim 4, wherein
the second connection portion is positioned at a same layer as the second touch electrode, and
an insulating layer is positioned between the first connection portion and the second connection portion.

6. The touch sensor device of claim 5, wherein
the second touch sensing region is deformable in the first direction.

7. The touch sensor device of claim 6, wherein
the first touch sensing region is deformable in the first direction, and
a curvature radius of the second touch sensing region is smaller than a curvature radius of the first touch sensing region.

8. The touch sensor device of claim 6, wherein
the first touch sensing region is substantially flat.

9. The touch sensor device of claim 6, wherein
a width of the first touch sensing region in the first direction is smaller than a width in a second direction crossing the first direction.

10. The touch sensor device of claim 4, wherein
the first touch electrode comprises a protrusion connected to the first connection portion.

11. The touch sensor device of claim 1, wherein
the first connection portion is positioned at an upper layer of the first touch electrode.

12. The touch sensor device of claim 1, wherein
the second touch sensing region is deformable in the first direction.

13. The touch sensor device of claim 12, wherein
the first touch sensing region is deformable in the first direction, and a curvature radius of the second touch sensing region is smaller than a curvature radius of the first touch sensing region.

14. The touch sensor device of claim 12, wherein the first touch sensing region is substantially flat.

* * * * *